United States Patent
Maltsev et al.

(10) Patent No.: US 9,281,979 B2
(45) Date of Patent: Mar. 8, 2016

(54) MILLIMETER-WAVE LINE OF SIGHT MIMO COMMUNICATION SYSTEM FOR INDOOR APPLICATIONS

(71) Applicant: Intel Corporation, Santa Clara, CA (US)

(72) Inventors: Alexander Maltsev, Nizhny Novgorod (RU); Ali Sadri, San Diego, CA (US); Andrey Pudeyev, Nizhny Novgorod (RU); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/127,789

(22) PCT Filed: Oct. 16, 2013

(86) PCT No.: PCT/US2013/065309
§ 371 (c)(1),
(2) Date: Dec. 19, 2013

(87) PCT Pub. No.: WO2014/133592
PCT Pub. Date: Sep. 4, 2014

(65) Prior Publication Data
US 2014/0177742 A1 Jun. 26, 2014

(51) Int. Cl.
*H04B 7/02* (2006.01)
*H04L 27/26* (2006.01)
*H04B 7/04* (2006.01)
(Continued)

(52) U.S. Cl.
CPC .......... *H04L 27/2601* (2013.01); *H04B 7/0408* (2013.01); *H04B 7/0413* (2013.01); *H04B 7/0617* (2013.01); *H04B 7/086* (2013.01); *H04B 7/10* (2013.01); *H04L 27/2626* (2013.01); *H04L 27/2647* (2013.01)

(58) Field of Classification Search
CPC ............ H04L 27/2601; H04L 27/2647; H04L 27/2626; H04L 1/0618; H04L 1/06; H04L 25/0204; H04L 25/4902; H04L 1/0009; H04L 1/0041; H04L 25/49; H04L 1/0003; H04B 7/0417; H04B 7/0669; H04B 3/54
USPC .......................... 375/267, 260, 259, 316, 295
See application file for complete search history.

(56) References Cited

U.S. PATENT DOCUMENTS

2008/0026697 A1 1/2008 Signell et al.
2010/0113099 A1 5/2010 Uno et al.
(Continued)

FOREIGN PATENT DOCUMENTS

KR 2005-0098023 10/2005
WO 2013017175 2/2013

OTHER PUBLICATIONS

International Search Report and Written Opinion, PCT/ISA/210, PCT/ISA/220, PCT/ISA/237, mail date Jan. 28, 2014, total of 8 pages.
(Continued)

*Primary Examiner* — Zewdu Kassa
(74) *Attorney, Agent, or Firm* — Pilsbury Winthrop Shaw Pittman LLP

(57) ABSTRACT

A Multiple-Input Multiple-Output (MIMO) communication system is described. The system may include a transmitting device having at least two transmitting antennae, each of the at least two transmitting antenna is configured to form and/or steer directional beam signals, and a receiving device having at least two receiving antennae. The transmitting device and the receiving device are configured and disposed such that illuminated spots at the receiving device produced by the beam signals of the transmitting antennae are smaller than spatial separation between neighboring receiving antennae and/or resolution spots from the receiving antenna are smaller than spatial separation between the transmitting antennae.

22 Claims, 8 Drawing Sheets

(51) Int. Cl.
*H04B 7/06* (2006.01)
*H04B 7/08* (2006.01)
*H04B 7/10* (2006.01)

(56) References Cited

U.S. PATENT DOCUMENTS

2010/0164804 A1* 7/2010 Xu et al. .................. 342/372
2011/0098010 A1* 4/2011 Mihota ....................... 455/101
2012/0314791 A1 12/2012 Zhang et al.

OTHER PUBLICATIONS

International Preliminary Report on Patentability mailed Sep. 11, 2015 for corresponding International Patent Application No. PCT/US2013/065309 (10 pages).

* cited by examiner

MILLIMETER-WAVE LINE OF SIGHT MIMO COMMUNICATION SYSTEM FOR INDOOR APPLICATIONS

CROSS-REFERENCE TO RELATED APPLICATIONS

This application is a national stage 371 application of PCT/US2013/065309, filed on Oct. 16, 2013, which claims benefit to U.S. Provisional Application No. 61/769,415 filed Feb. 26, 2013, the entire contents of both of which are incorporated herein by reference.

TECHNICAL FIELD

This disclosure relates generally to indoor communication systems, and in particular, to multiple-input and multiple-output (MIMO) communication systems and methods.

BACKGROUND ART

In recent years, with new software applications requiring high data throughput, wired data transmission techniques have been developed that allow data rates of up to 10 gigabits per second (Gbps). Wireless communication protocols such as, for example, LTE and WiFi provide high data transfer rate, but cannot yet match the high data throughput of wired transmission such as, for example, Thunderbolt or HDMI. There is a pressing need for wireless data transmission techniques to catch up with such high-throughput requirements to cater to application such as wireless PC docking, wireless PCI-E bus, USB, HDMI, etc.

DETAILED DESCRIPTION

Figure 1:
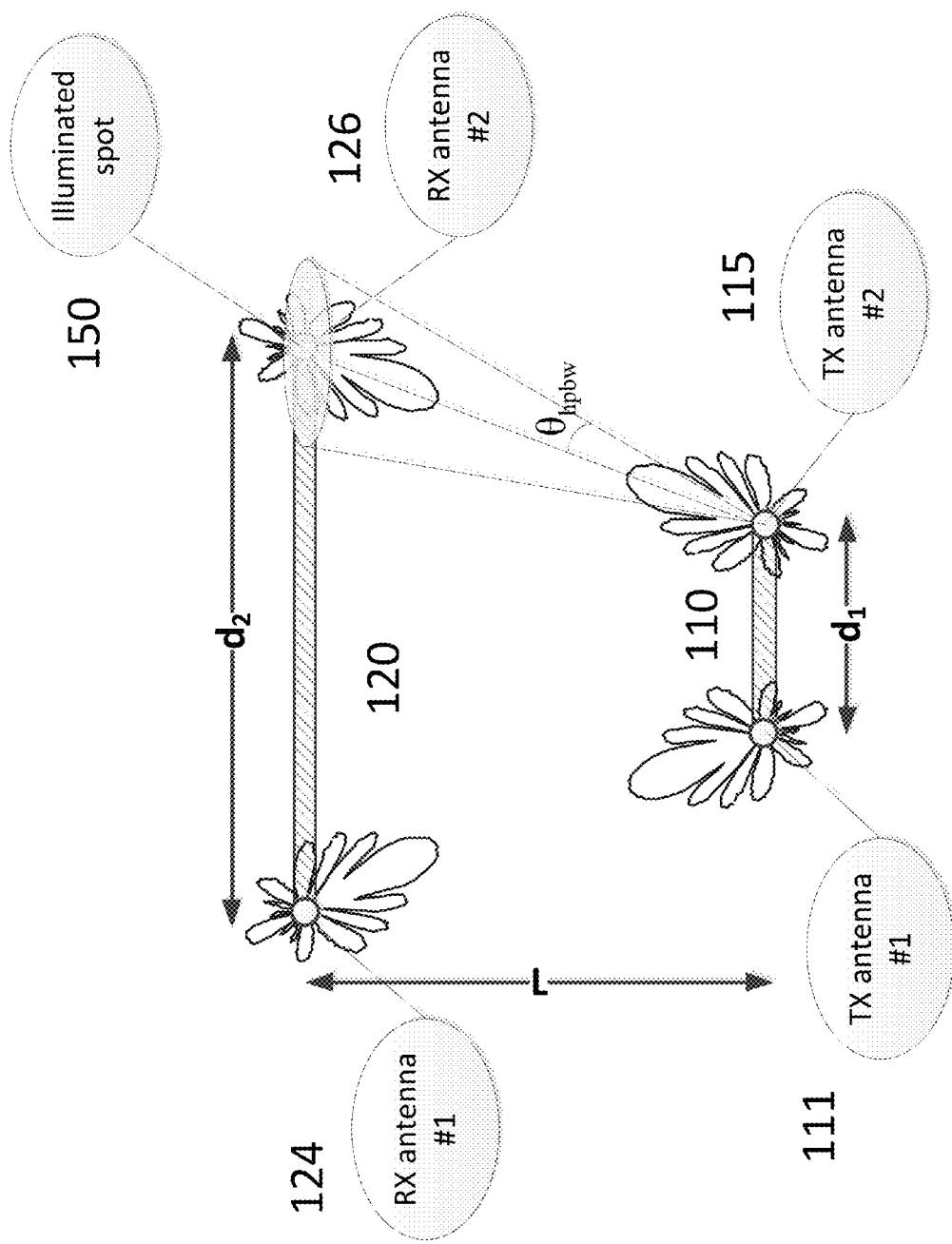
FIG. 1 depicts an illustrative schematic geometrical deployment of a 2×2 Line-of-Sight Multiple-Input Multiple-Output (LOS MIMO) communication system with a large receiving antenna base in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is disclosed is a communication system including a transmitting device having at least two transmitting antennae, each of the at least two transmitting antenna being configured to form and/or steer directional beam signals and a receiving device having at least two receiving antennae. The transmitting device and the receiving device are configured and disposed such that illuminated spots at the receiving device produced by the beam signals of the transmitting antennae are smaller than spatial separation between neighboring receiving antennae and/or resolution spots from the receiving antenna are smaller than spatial separation between the transmitting antennae.

In another embodiment, a device includes at least two transmitting antennae, each antenna being configured to form and/or steer directional beam signals. The device is configured to communicate with a receiving device having the same number of receiving antennae as the transmitting antennae on the device disposed such that resolution spots from the receiving antennae are smaller than spatial separation between neighboring transmitting antennae.

In yet another embodiment, a device includes at least two receiving antennae, each antenna being configured to receive directional beam signals. The device is configured to communicate with a transmitting device having the same number transmitting antennae as the receiving antennae of the device disposed such that illuminated spots at the receiving device produced by the beam signals of the transmitting antennae are smaller than spatial separation between neighboring receiving antennae.

In an additional embodiment, a communication method includes (i) providing a transmitting device having at least two transmitting antennae configured to form and/or steer directional beam signals, (ii) providing a receiving device having at least two receiving antennae, and (iii) transmitting directional beam signals from the at least two transmitting antennae on a transmitting device. The at least two transmitting antennae are disposed such that illuminated spots at the receiving device produced by the beam signals of the transmitting antennae are smaller than spatial separation between neighboring receiving antennae and/or resolution spots from the receiving antennae are smaller than spatial separation between the transmitting antennae.

Carrier signal, carrier wave, or just carrier, may be used interchangeably herein and refer to a waveform that is modulated with an input signal for the purpose of conveying information. A carrier may include electromagnetic radiation having frequency from about 1 kHz to about 10 PHz (low frequency radio waves to optical waves). In general, the maximum possible data transfer rate possible on a carrier increases as its frequency increases. Thus, higher frequency carriers are preferable for higher data rates. On the other hand, because wavelength is inversely proportional to frequency, higher frequency carriers are affected by obstacles and undergo rapid attenuation. Thus, while walls and buildings are opaque to carriers in optical frequency range, they are generally transparent to lower frequency radio waves. As such, there is generally a trade-off between range and data rate when choosing an appropriate carrier frequency for a particular application.

Line-of-sight (LOS) communication is defined as communication between a transmitter and a receiver that are in view of each other without an obstacle between them. A signal between a transmitter and a receiver may be diffracted, refracted, reflected, or absorbed by atmosphere and obstructions with material and generally cannot travel over the horizon or behind obstacles. Electromagnetic radiation travels in straight lines, and hence, all wireless communication using electromagnetic radiation is generally LOS communication. Where signals appear to not have a LOS limitation, the signals are either diffracted or reflected, e.g. by earth's curvature, or ionosphere, leading to quasi-curved paths that allow a receiver to receive the signals well after the transmitter has dropped below the horizon.

Extremely high frequency is a radio frequency band (generally ranging from 30-300 GHz), with waves having a wavelengths from ten to one millimeter (hence, the name millimeter wave, or mm-wave). Signals in this band are prone to atmospheric attenuation, limiting their range and utility in outdoor applications. Furthermore, mm-waves are blocked by building walls and attenuated by foliage. However, mm-waves can be useful in short-range LOS indoor applications to improve spectrum utilization. Moreover, the short wavelength of mm-waves allows for directional transmission and steering of signals. Additionally, higher frequency of mm-waves allows for higher data transfer rates when compared to longer wave-length radiation used in, for example, WiFi networks.

MIMO or Multiple-Input and Multiple-Output technology involves use of multiple antennae as both the transmitter and receiver to improve communication performance. Because MIMO technology offers increases in data throughput and link range without additional bandwidth or increased power requirements, MIMO technology is an attractive candidate high-throughput wireless communication.

Disclosed herein are embodiments of systems, devices and methods implementing LOS MIMO communication using mm-waves. In an embodiment, a system includes a transmitting device having at least two transmitting antennae, and a receiving device having at least two receiving antennae. Each of the antennae is configured to form and steer directional beam signals carrying data signals. The transmitting device and the receiving device are configured and disposed such that an illuminated spot at the receiving device from the transmitting antennae is smaller than spatial separation between neighboring receiving antennae and/or a resolution spot from the receiving antenna is smaller than spatial separation between the transmitting antennae.

FIG. 1 depicts an illustrative schematic geometrical deployment of a 2×2 LOS MIMO communication system with a large receiving antenna base in accordance with various aspects and principles of the present disclosure. Transmitting device 110 includes two directional transmitting antennae 113 and 115 disposed distance d1 apart and receiving device 120 includes two receiving antennae 124 and 126 disposed distance d2 apart.

In various embodiments, antennae may include antenna arrays. As used herein, an antenna array refers to a group of radiators such that the currents running through them are of different amplitudes and/or phases. Data transmitted or received using an antenna array may be appropriately multiplexed such as maximize data transfer rate.

A directional antenna is defined as a device configured to radiate electromagnetic radiation such that greater power is radiated in one or more directions. The direction along which maximum power is radiated is referred to as the main lobe of the antenna radiation pattern. In some embodiments, a directional antenna may be configured such that the direction of the main lobe of its radiation pattern may be changed. In such embodiments, the process of changing the direction of the main lobe is referred to as beam-steering. Beam-steering can be achieved, in some embodiments, by switching the antenna elements or by changing the relative phases of the signals driving the elements.

Beamwidth of the antenna is defined as the width of the main lobe. The angle between half-power (−3 dB) points of the main lobe, when referenced to the peak effective radiated power of the main lobe is defined as the half-power beamwidth.

Illumination spot refers to an area where a beam or signal from a transmitting device can be received. For example, referring to FIG. 1, transmitting antenna 115 is configured to transmit signals in a particular direction having a beamwidth defined by half-power beam-width angle $\theta_{hpbw}$ radians to form illumination spot 150 when distance between device 110 and 120 is L.

Similarly, resolution spot refers to an area covered at a particular distance by the half-power beam-width of the main lobe of a receiving antenna. For example, referring to FIG. 1A, receiving antenna 116A is configured to receiving signals along its main lobe which has half-power beam-width angle $\theta_{hpbw}$ radians. The resolution spot of receiving antenna 116A at transmitting device 120A can, therefore, be depicted by area 150A. It would be clear to the skilled artisan that both the illumination spot and the resolution spots are proportional to the distance between the receiving device and the transmitting device.

In some embodiments, LOS MIMO is implemented by physically separating neighboring transmitting (and receiving) antennae from each other based on geometrical constraints. For example, referring back to FIG. 1, transmitting antenna 113 on device 110 transmits data over a signal to receiving antenna 124 on device 120 and transmitting antenna 115 on device 110 transmits data over a separate signal to receiving antenna 126 on device 120. MIMO can be effectively implemented in this embodiment if signal from transmitting antenna 113 is received only by receiving antenna 124 and not by receiving antenna 126, and signal from transmitting antenna 115 is received only by receiving antenna 126 and not by receiving antenna 124. Thus, if transmitting antennae 113 and 115 are separated by distance $d_1$, receiving antennae 124 and 126 are separated by distance $d_2$, and device 110 and device 120 are separated by a distance L, the geometrical constraint for effective implementation of LOS MIMO can be approximately expressed by:

$$\max\{d_1, d_2\} > L \cdot \theta_{hpbw} \qquad \text{(Equation. 1)}$$

where $\theta_{hpbw}$ is the half-power beamwidth in radians of the transmitting antennae.

In various embodiments, antennae may be designed to transmit (or receive) signals in a particular direction. Examples of such antennae include, but are not limited to: Adcock antenna, AS-2259 antenna, AWX antenna, Batwing antenna, Beverage antenna, Cantenna, Cassegrain antenna, Collinear antenna array, Conformal antenna, Curtain array, Dipole antenna, Doublet antenna, Folded Inverted Conformal antenna, Fractal antenna, G5RV antenna, Gizmotchy, Helical antenna, Horizontal curtain, Horn antenna, HRS antenna, Inverted vee antenna, Log-periodic antenna, Loop antenna, Microstrip antenna, Patch antenna, Phased array, Parabolic antenna, Quad antenna, Reflective array antenna, Regenerative loop antenna, Rhombic antenna, Sector antenna, Short backfire antenna, Sloper antenna, Slot antenna, Sterba antenna, Turnstile antenna, Vivaldi-antenna, WokFi, Yagi-Uda antenna, and so forth. It should be noted that the choice of a particular antenna type is dependent factors such as, for example, antenna size, device size, directionality, beam width, power availability and consumption, electrical efficiency, resonant frequency (or frequencies), data rate, production methods, scalability, and so forth.

For example, phased array antennae having small form factors (e.g. 1 cm×2.5 cm) can be mass produced and have high antenna gain (about 15 dB) and are capable of beam-steering. This, if a 2×8 phased array with a half-power beamwidth of 12° is used, the effective range for an LOS MIMO application will be about five times larger than the spacing between neighboring antenna arrays. In various embodiments, such an implementation may provide a data rate of up to 15-20 GHz over the air at distances up to 10 meters.

Figure 1A:
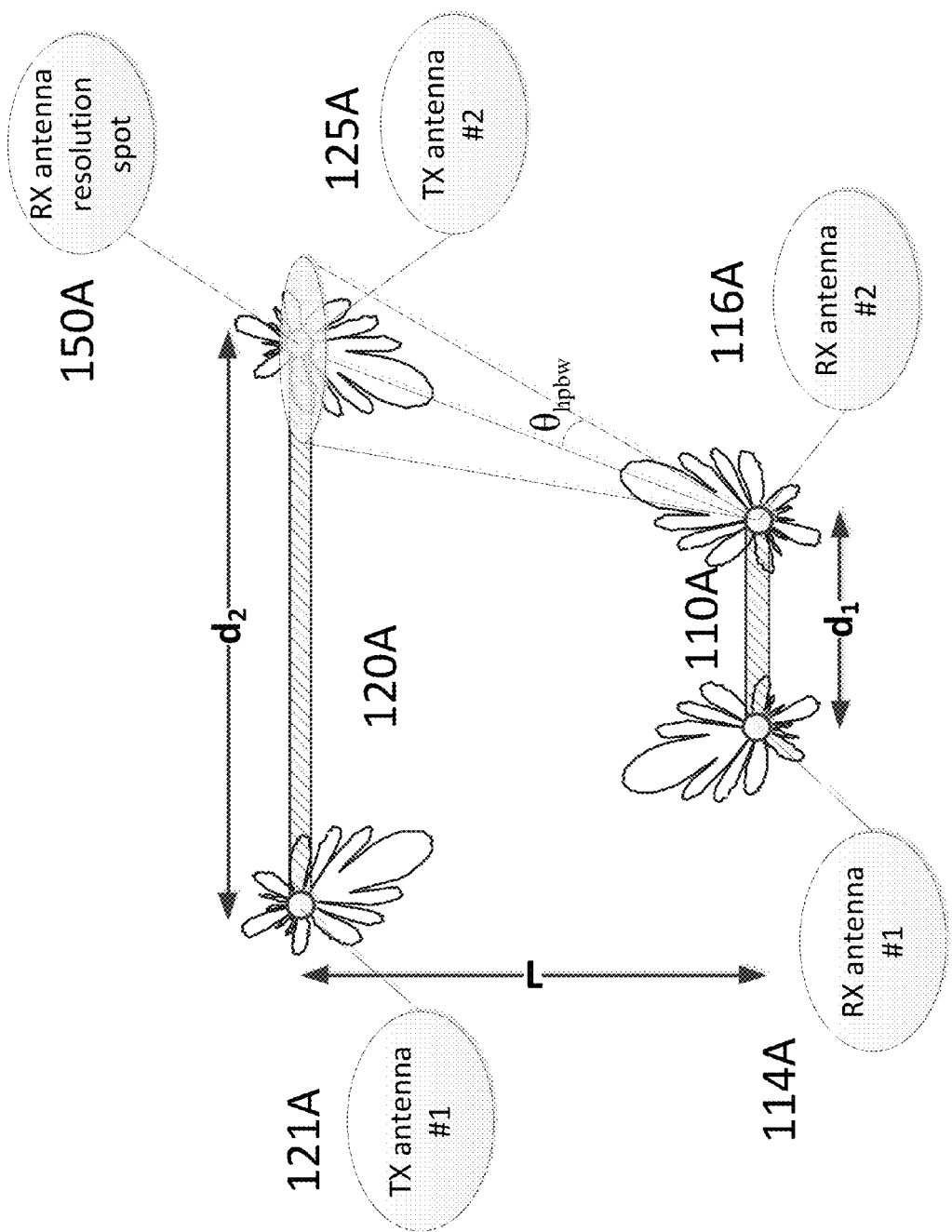
FIG. 1A depicts an illustrative schematic geometrical deployment of a 2×2 LOS MIMO communication system with a large transmitting antenna base in accordance with various aspects and principles of the present disclosure.
Figure 1B:
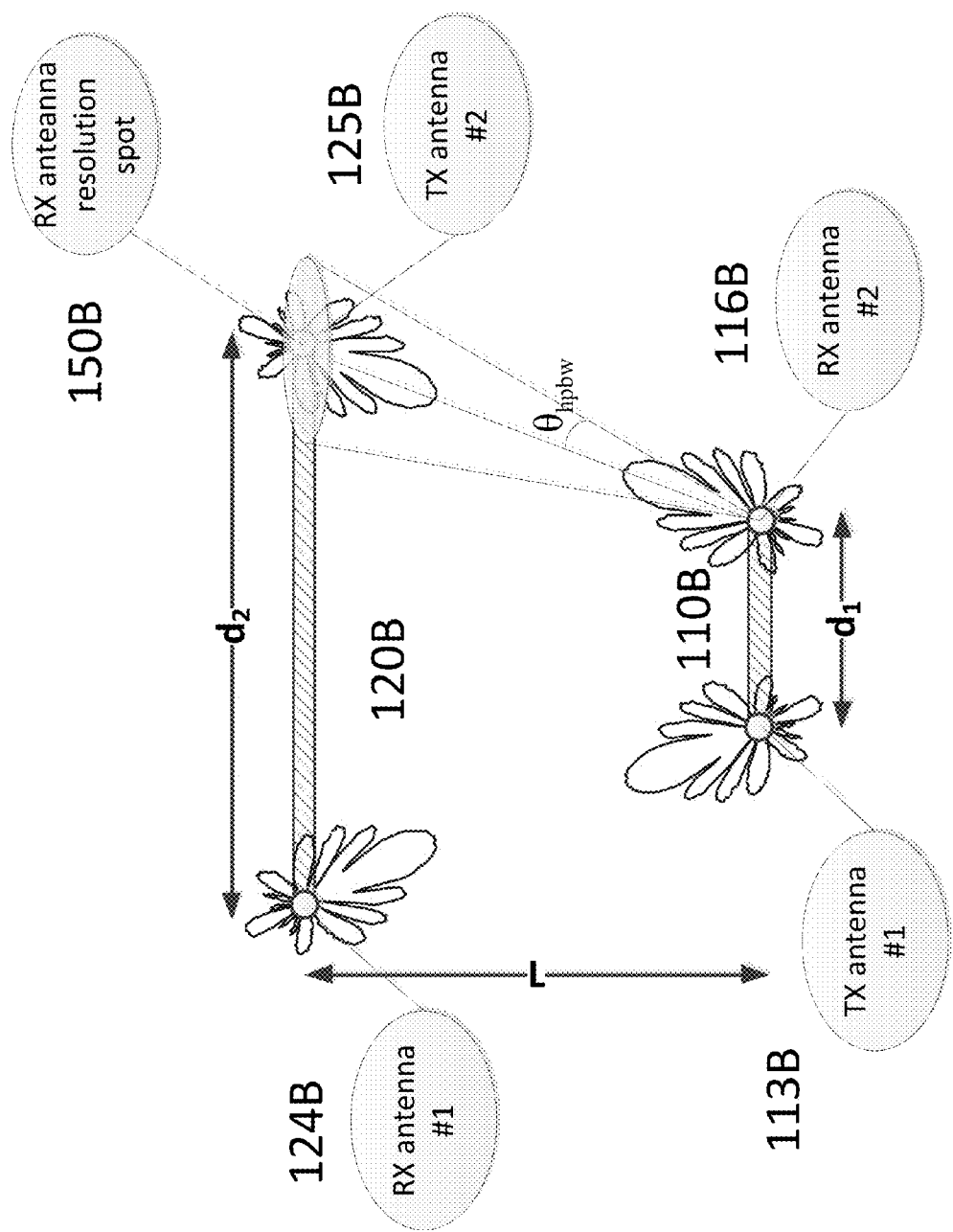
FIG. 1B depicts an illustrative schematic geometrical deployment of a 2×2 LOS MIMO communication system having full duplex configuration in accordance with various aspects and principles of the present disclosure.

FIGS. 1A and 1B provide depictions of various embodiments of a 2×2 LOS MIMO system. In FIG. 1A, unlike in FIG. 1, transmitting antennae 123A and 125A on device 120A are separated by a distance $d_2$ which is larger than the distance $d_1$ between receiving antenna 114A and receiving antenna 116A on device 110A. In FIG. 1B, on the other hand, device 110B has a transmitting antenna 113B and a receiving antenna 116B which communicate with receiving antenna 124B and transmitting antenna 125B respectively, on device 120B.

In various embodiments, the signals transmitted through a transmitting antenna are pre-processed before transmission, for example, to provide appropriate meta-data (e.g., channel state information, spatial signatures, etc.) such that the corresponding receiving antenna may understand that the signal being transmitted from the particular transmitting antenna. The pre-processing may further include splitting the signal into multiple signals (e.g., having lower data rate) so that the signal may be multiplexed if so required in a particular application. In some embodiments, pre-processing may include baseband precoding.

Signals received at a receiving antenna may, likewise, undergo post-processing to, e.g. identify from where the signal is being transmitted, improve signal to noise ratio, detect and filter out unwanted signals such as those from co-channel interference and so forth. Post-processing may include demultiplexing where the received signals have been multiplexed. In some embodiments, post-processing may include baseband decoding.

Interference, as used herein, refers to anything which alters, modifies or disrupts a signal as it travels between a source (or a transmitter) and a receiver and may be a result of, for example, (i) electromagnetic interference from nearby sources not part of the communication channel, (ii) co-channel interference resulting from cross-talk between channels using the same carrier, (iii) adjacent channel interference resulting from extraneous power bleeding through from an adjacent channel using a slightly different carrier frequency, and so forth.

Various techniques can be used to reduce or eliminate interference. For example, co-channel interference may be reduced by, for example, physically separating neighboring antennae based on a geometric constraint, using neighboring antennae that are configured to transmit signals having distinct polarizations, using various multiplexing techniques for transmitting signals, or using pre- and post-signal processing techniques for algorithmically separating useful signal from interference.

Polarization, as used herein, refers to the orientation of the electric field of the electromagnetic radiation transmitted and/or received by an antenna with respect to a reference. Transmitting signals over carriers of different polarizations helps to improve the signal to noise (s/n) ratio and reduces interference between neighboring antennae. In various embodiments, other techniques such as, for example, multiplexing may be used to reduce or eliminate interference.

Referring to FIG. 1, for example, transmitting antenna 113 transmits signals over vertically polarized carrier which is received at receiving antenna 124 whereas, transmitting antenna 115 transmits signals over horizontally polarized carrier which is received at receiving antenna 126. As such, even if a signal from transmitting antenna 112 is received at receiving antenna 124, this signal does is recognized as coming from antenna 112 because of its polarization and can be filtered out during post-processing. In various embodiments, polarizations may be vertical, horizontal, any orientation between vertical and horizontal, circular-counterclockwise, circular-clockwise, elliptical, and so forth.

In some embodiments, geometrical constraints of Equation 1 may be at least partially relaxed by using directional antennae that are configured to transmit and/or receive polarized signals and transmitting signals that are orthogonally polarized. In some other embodiments, multiplexing may be used to relax the geometrical constraints of Equation 1. In yet other embodiments, any combination of directional signals, polarized signals and multiplexing may be used for effective implementation of LOS MIMO as described herein. A skilled artisan will realize that various implementations of LOS MIMO will be dependent on the particular application for which the data transfer is being sought.

Figure 2:
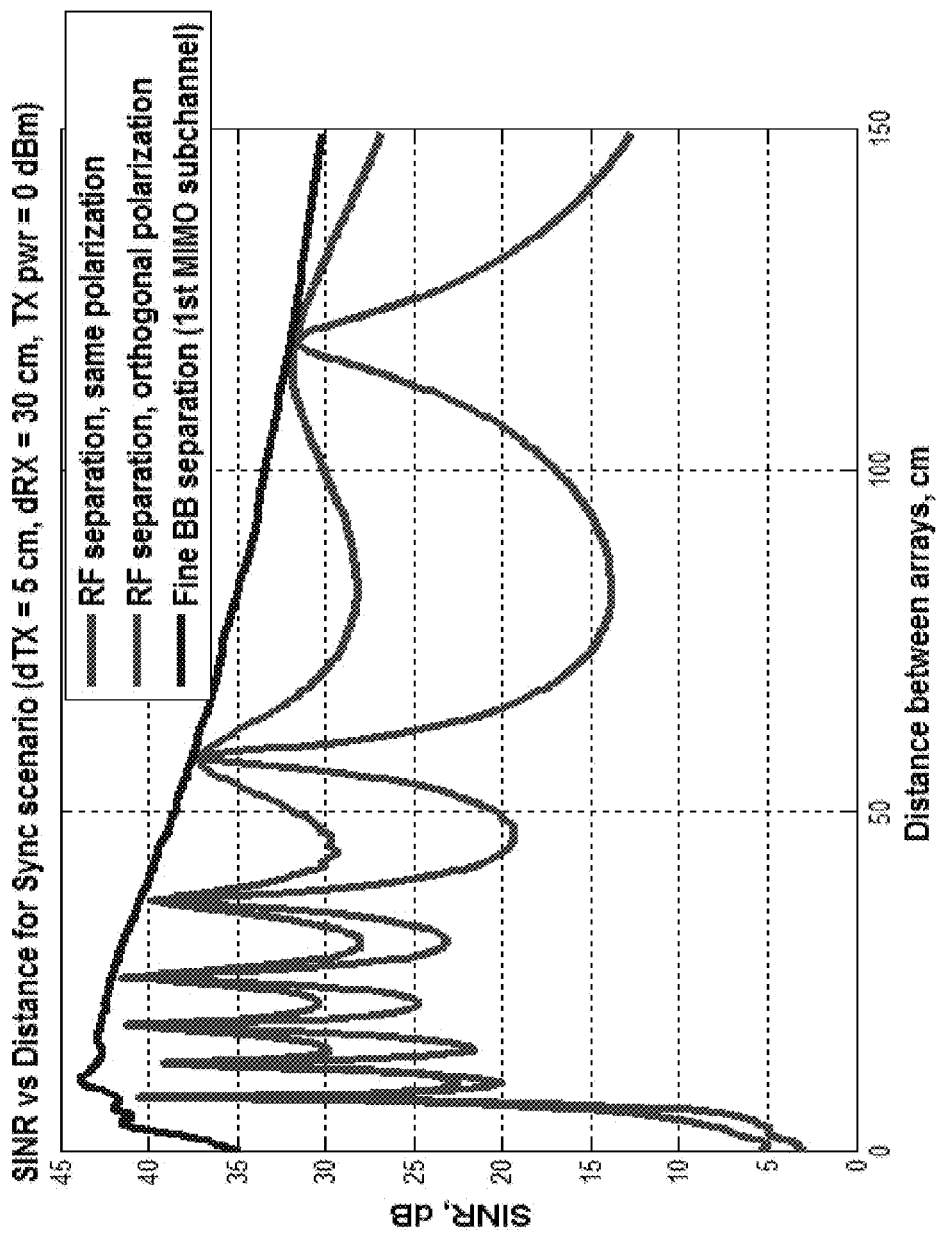
FIG. 2 shows illustrative simulation results for signal to noise ratio (SINR) for a LOS MIMO system in different modes of operation in accordance with various aspects and principles of the present disclosure.

FIG. 2 shows the simulation results for a LOS MIMO system with 2×2 phased antenna arrays for a Sync-and-Go application. It can be seen that geometric separation in the radio frequency (RF) part provides acceptable signal to interference plus noise ratio (SINR) for establishing the link and maximum data rate. However, baseband MIMO processing in addition to geometric separation in the RF part can provide SINR reserve and as such allow for energy savings by possibly decreasing transmission power by 10-15 dB.

Figure 3:
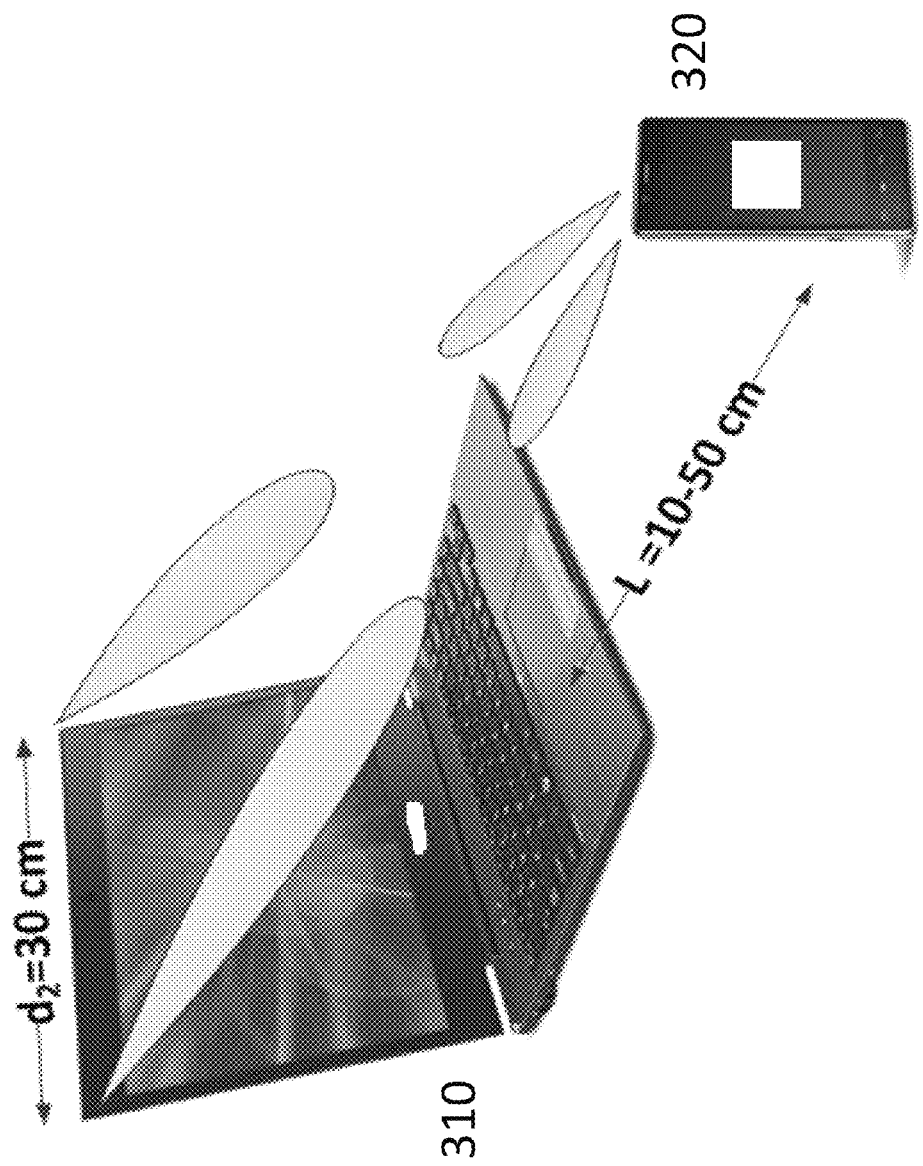
FIG. 3 depicts an example of short-range wireless synchronization (sync-and-go) in accordance with various aspects and principles of the present disclosure.

FIG. 3 shows a use-case scenario of short-range wireless synchronization (Sync-and-Go) communication between laptop computer 310 and smartphone 320, with each device having two antenna arrays. The LOS MIMO on the base of, e.g. WiGig protocol, is stable to provide connection speeds up to 14 Gbps between laptop 310 and smartphone 320.

Figure 4:
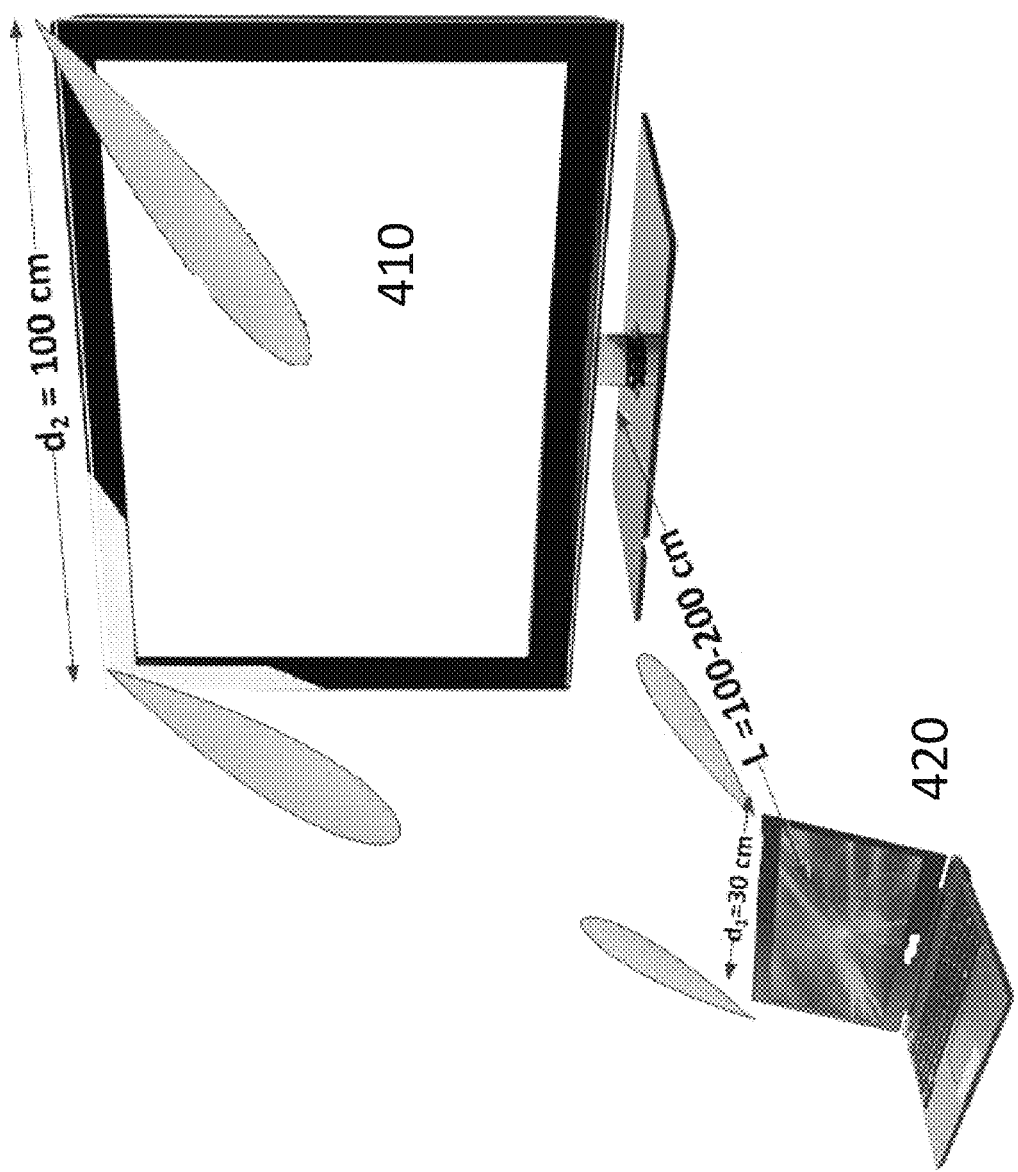
FIG. 4 depicts an alternative example of short-range wireless synchronization (sync-and-go) in accordance with various aspects and principles of the present disclosure.

FIG. 4 shows another use-case scenario of high-throughput video streaming from a video player on laptop 420 to high-definition (HD) display 410. 2×2 LOS MIMO (with 2 antenna arrays on each device), as described herein allows this communication to happen wirelessly.

Figure 5:
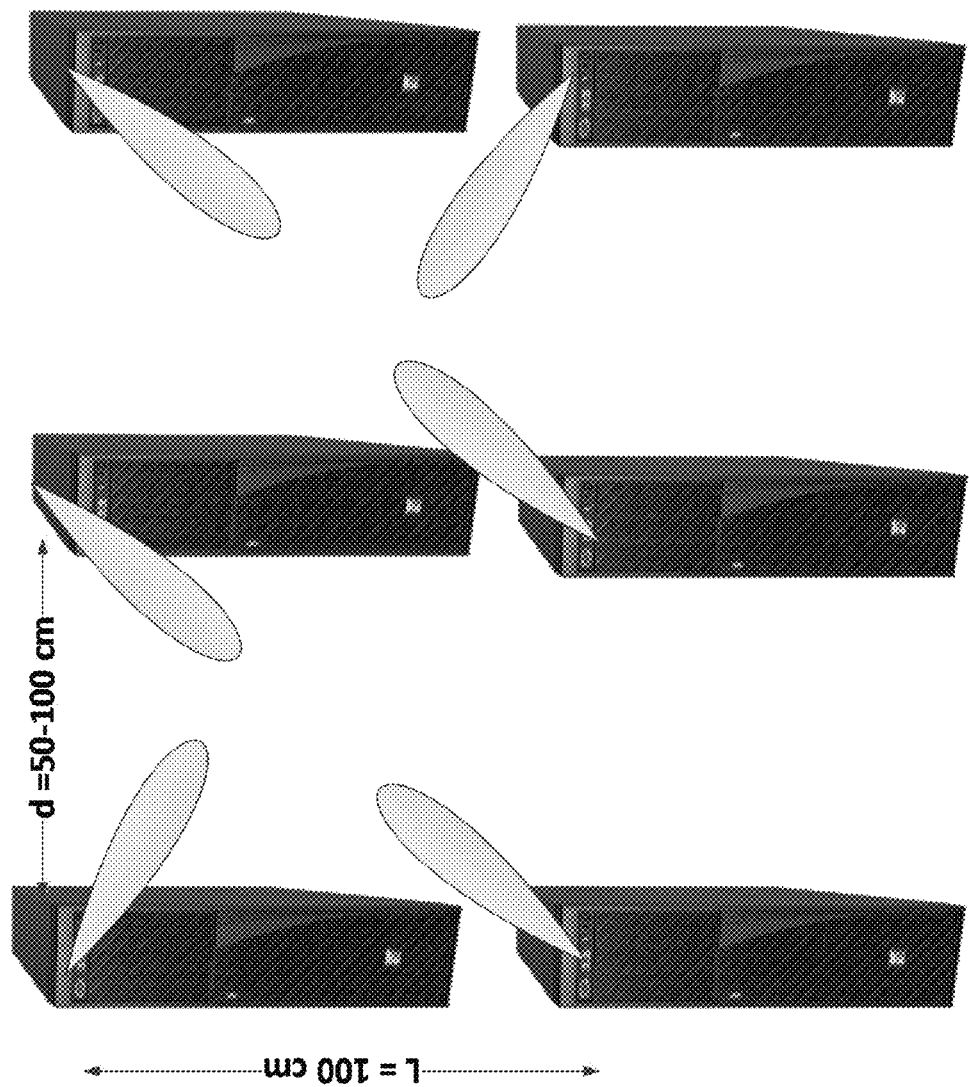
FIG. 5 depicts a schematic of communication between multiple servers in accordance with various aspects and principles of the present disclosure.

Additional embodiments may include implementation of LOS MIMO in multi-device communication such as, for example, in datacenter wireless communication, short-range relaying and backhauling and so forth. Such embodiments may include one-to-many, many-to-one, and many-to-many implementations of LOS MIMO in accordance with various principles and aspects described herein. For example, FIG. 5 depicts a schematic of communication between multiple servers, each having one directional transmitting antenna and multiple receiving antennae configured such that the each of the receiving antennae receives a signal from a distinct server.

Figure 6:
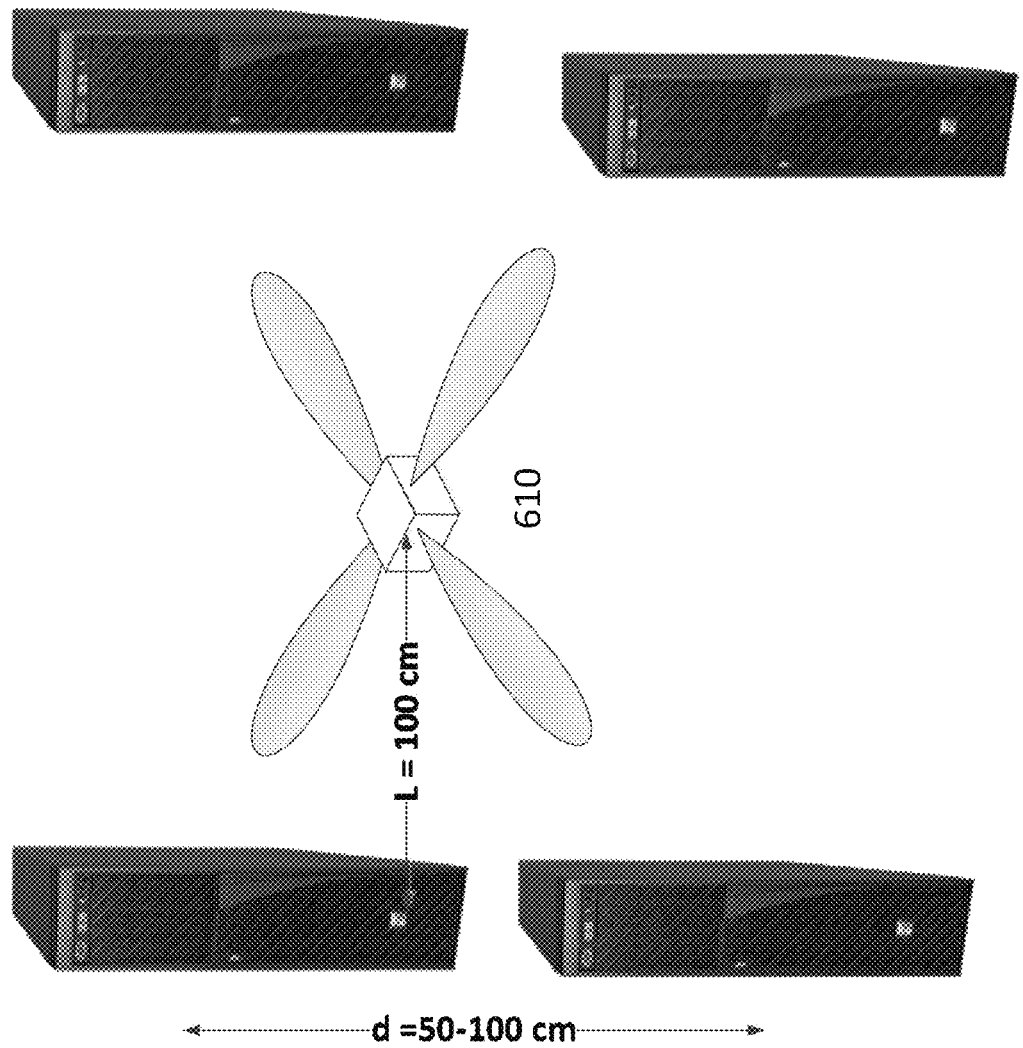
FIG. 6 depicts a schematic of a communication between a router and multiple servers in accordance with various aspects and principles of the present disclosure.

In some embodiments, communicating devices implementing LOS MIMO may include more than 2 antennae per device. For example, some embodiments may include 3×3, 4×4 or 5×5 antenna arrays. For example, FIG. 6 depicts a schematic of a communication between a router and multiple servers. The router 610, as shown in FIG. 6, has 4 transmitting antennae, each configured to communicate with a distinct server. A skilled artisan will be able to implement more multi-device, multi-antenna combinations to implement LOS MIMO in accordance with various principles and aspects described herein.

Another embodiment is implemented as a program product for implementing systems and methods described herein. Some embodiments can take the form of an entirely hardware embodiment, an entirely software embodiment, or an embodiment containing both hardware and software elements. Some embodiments may be implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

Embodiments within the scope of the present disclosure may further include computer-readable media for carrying or having computer-executable instructions or data structures stored thereon. Such computer-readable media can be any available media that can be accessed by a general purpose or a special purpose computer. Such computer-readable media may include, but are not limited to, RAM, ROM, EEPROM, CD-ROM, or other optical disk storage, magnetic disk storage, or other magnetic storage devices, or any other medium which can be used to carry or store desired program code means in the form of computer-executable instructions or data structures. When information is transferred or provided over a network or another communications connection (either hardwired, wireless or a combination thereof) to a computer, the computer properly views the connection as a computer-readable medium. Thus, any such connection is properly termed as computer-readable medium. Combinations of the above should also be included within the scope of the computer-readable media.

Computer-executable instructions include, but are not limited to, instructions and data which cause a general purpose computer, a special purpose computer, or a special purpose processing device to perform a certain function or a group of functions. Computer-executable instructions also include program modules that are executed by computers in stand-alone or network environments. Generally, program modules include routines, programs, objects, components, data structures, and the like, that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

EXAMPLES

The following examples highlight non-limiting characteristics and attributes of the various and principles of the present disclosure:

Example 1 is a communication system including a transmitting device having at least two transmitting antennae, each of the at least two transmitting antenna being configured to form and/or steer directional beam signals and a receiving device having at least two receiving antennae. The transmitting device and the receiving device are configured and disposed such that illuminated spots at the receiving device produced by the beam signals of the transmitting antennae are smaller than spatial separation between neighboring receiving antennae and/or resolution spots from the receiving antenna are smaller than spatial separation between the transmitting antennae.

Example 2 is the communication system of example 1, wherein the transmitting antennae and the receiving antennae are further configured to transmit and/or receive mm-wave signals.

Example 3 is the communication system of any one of examples 1-2, wherein neighboring antennae have orthogonal polarization.

Example 4 is the communication system of any one of examples 1-3, wherein the transmitting device and/or the receiving device are enabled to apply multiple-input multiple-output (MIMO) baseband processing to a signal being transmitted and/or received.

Example 5 is the communication system of any one of examples 1-4, further comprising a plurality of transmitting devices having at least two transmitting antennae, each antenna being configured to form and/or steer directional beam signals.

Example 6 is the communication system of any one of examples 1-5, further comprising a plurality of receiving devices having at least two receiving antennae, each antenna being configured to receive directional beam signals.

Example 7 is a device including at least two transmitting antennae, each antenna being configured to form and/or steer directional beam signals. The device is configured to communicate with a receiving device having the same number of receiving antennae as the transmitting antennae on the device disposed such that resolution spots from the receiving antennae are smaller than spatial separation between neighboring transmitting antennae.

Example 8 is the device of example 7, wherein the transmitting antennae are configured to transmit mm-wave signals.

Example 9 is the device of any one of examples 7-8, wherein the device is enabled to apply MIMO baseband processing to a signal being transmitted.

Example 10 is the device of any one of examples 7-9, wherein neighboring transmitting antennae have orthogonal polarization.

Example 11 is the device of any one of examples 7-10, wherein the device is further configured to communicate with a plurality of receiving devices.

Example 12 is a device including at least two receiving antennae, each antenna being configured to receive directional beam signals. The device is configured to communicate with a transmitting device having the same number transmitting antennae as the receiving antennae of the device disposed such that illuminated spots at the receiving device produced by the beam signals of the transmitting antennae are smaller than spatial separation between neighboring receiving antennae.

Example 13 is the device of example 12, wherein the receiving antennae are configured to receive mm-wave signals.

Example 14 is the device of any one of examples 12-13, wherein the device is enabled to apply MIMO baseband post-processing to a signal being received.

Example 15 is the device of any one of examples 12-14, wherein neighboring receiving antennae are further configured to receive orthogonally polarized signals.

Example 16 is the device of any one of examples 12-15, wherein the device is further configured to communicate with a plurality of transmitting devices.

Example 17 is a communication method including (i) providing a transmitting device having at least two transmitting antennae configured to form and/or steer directional beam signals, (ii) providing a receiving device having at least two receiving antennae, and (iii) transmitting directional beam signals from the at least two transmitting antennae on a transmitting device. The at least two transmitting antennae are disposed such that illuminated spots at the receiving device produced by the beam signals of the transmitting antennae are smaller than spatial separation between neighboring receiving antennae and/or resolution spots from the receiving antennae are smaller than spatial separation between the transmitting antennae.

Example 18 is the method of example 17, wherein the transmitting antennae and the receiving antennae are further configured to transmit and/or receive mm-wave signals.

Example 19 is the method of any one of examples 17-18, wherein neighboring antennae have orthogonal polarization.

Example 20 is the method of any one of examples 17-19, wherein the transmitting device and/or the receiving device are enabled to apply multiple-input multiple-output (MIMO) baseband processing to a signal being transmitted and/or received.

Example 21 is a computer-readable medium comprising computer readable code physically embodied thereon which, when executed by a processor, causes the processor to perform a method of any one of examples 17-20.

Example 22 is a computer-readable medium comprising computer-readable instructions to implement, when executed, the method of any one of examples 17-20.

Example 23 is an electronic device comprising means for performing a method of any one of examples 17-20.

Example 24 is the communication system of example 1, wherein neighboring antennae have orthogonal polarization.

Example 25 is the communication system of example 1, wherein the transmitting device and/or the receiving device are enabled to apply multiple-input multiple-output (MIMO) baseband processing to a signal being transmitted and/or received.

Example 26 is the system of example 1, further comprising a plurality of transmitting devices having at least two transmitting antennae, each antenna being configured to form and/or steer directional beam signals.

Example 27 is the system of example 1, further comprising a plurality of receiving devices having at least two receiving antennae, each antenna being configured to receive directional beam signals.

Example 28 is the device of example 7, wherein the device is enabled to apply MIMO baseband processing to a signal being transmitted.

Example 29 is the device of example 7, wherein neighboring transmitting antennae have orthogonal polarization.

Example 30 is the device of example 7, wherein the device is further configured to communicate with a plurality of receiving devices.

Example 31 is the device of example 12, wherein the device is enabled to apply MIMO baseband post-processing to a signal being received.

Example 32 is the device of example 12, wherein neighboring receiving antennae are further configured to receive orthogonally polarized signals.

Example 33 is the device of example 12, wherein the device is further configured to communicate with a plurality of transmitting devices.

Example 34 is the method of example 17, wherein neighboring antennae have orthogonal polarization.

Example 35 is the method of examples 17, wherein the transmitting device and/or the receiving device are enabled to apply multiple-input multiple-output (MIMO) baseband processing to a signal being transmitted and/or received.

Example 36 is a system comprising at least one electronic device comprising a processor, in communication with a memory, for executing instructions to perform a method of any one of examples 17-20.

Example 37 is a computer program product comprising a computer-readable medium having computer program logic recorded thereon arranged to execute the method of any one of examples 17-20.

What is claimed is:

1. A communication system comprising:
    a transmitting device having at least two transmitting antennae, each of the at least two transmitting antenna is configured to form and/or steer directional beam signals; and
    a receiving device having at least two receiving antennae, wherein the transmitting device and the receiving device are configured and disposed such that illuminated spots at the receiving device produced by the beam signals of the transmitting antennae are smaller than spatial separation between neighboring receiving antennae, wherein each of the illuminated spots is associated with a certain beam-width angle of the beam signals, and/or resolution spots from the receiving antenna are smaller than spatial separation between the transmitting antenna.

2. The communication system of claim 1, wherein the transmitting antennae and the receiving antennae are further configured to transmit and/or receive mm-wave signals.

3. The communication system of claim 1, wherein neighboring antennae have orthogonal polarization.

4. The communication system of claim 1, wherein the transmitting device and/or the receiving device are enabled to apply multiple-input multiple-output (MIMO) baseband processing to a signal being transmitted and/or received.

5. The system of claim 1, further comprising a plurality of transmitting devices having at least two transmitting antennae, each antenna being configured to form and/or steer directional beam signals.

6. The system of claim 1, further comprising a plurality of receiving devices having at least two receiving antennae, each antenna being configured to receive directional beam signals.

7. A device comprising:
    at least two transmitting antennae, each antenna being configured to form and/or steer directional beam signals,
    wherein the device is configured to communicate with a receiving device having the same number of receiving antennae as the transmitting antennae on the device disposed such that resolution spots from the receiving antennae are smaller than spatial separation between neighboring transmitting antennae, wherein each of the resolution spots is associated with an area covered at a certain distance by a lobe of the receiving antennae.

8. The device of claim 7, wherein the transmitting antennae are configured to transmit mm-wave signals.

9. The device of claim 7, wherein the device is enabled to apply MIMO baseband processing to a signal being transmitted.

10. The device of claim 7, wherein neighboring transmitting antennae have orthogonal polarization.

11. The device of claim 1, wherein the device is further configured to communicate with a plurality of receiving devices.

12. A device comprising:
    at least two receiving antennae, each antenna being configured to receive directional beam signals,
    wherein the device is configured to communicate with a transmitting device having the same number transmitting antennae as the receiving antennae of the device disposed such that illuminated spots at the receiving device produced by the beam signals of the transmitting antennae are smaller than spatial separation between neighboring receiving antennae, wherein each of the illuminated spots is associated with a certain beam-width angle of the beam signals.

13. The device of claim 12, wherein the receiving antennae are configured to receive mm-wave signals.

14. The device of claim 12, wherein the device is enabled to apply MIMO baseband post-processing to a signal being received.

15. The device of claim 12, wherein neighboring receiving antennae are further configured to receive orthogonally polarized signals.

16. The device of claim 12, wherein the device is further configured to communicate with a plurality of transmitting devices.

17. A communication method comprising:
providing a transmitting device having at least two transmitting antennae configured to form and/or steer directional beam signals;
providing a receiving device having at least two receiving antennae; and
transmitting directional beam signals from the at least two transmitting antennae on a transmitting device,
wherein the at least two transmitting antennae are disposed such that illuminated spots at the receiving device produced by the beam signals of the transmitting antennae are smaller than spatial separation between neighboring receiving antennae, wherein each of the illuminated spots is associated with a certain beam-width angle of the beam signals, and/or resolution spots from the receiving antennae are smaller than spatial separation between the transmitting antennae.

18. The method of claim 17, wherein the transmitting antennae and the receiving antennae are further configured to transmit and/or receive mm-wave signals.

19. The method of claim 17, wherein neighboring antennae have orthogonal polarization.

20. The method of claim 17, wherein the transmitting device and/or the receiving device are enabled to apply multiple-input multiple-output (MIMO) baseband processing to a signal being transmitted and/or received.

21. A computer-readable medium comprising computer readable code physically embodied thereon which, when executed by a processor, causes the processor to perform a method of claim 17.

22. A computer program product comprising a computer-readable medium having computer program logic recorded thereon arranged to execute the method of claim 17.

* * * * *